United States Patent [19]

Castenschiold et al.

[11] Patent Number: 5,070,252
[45] Date of Patent: Dec. 3, 1991

[54] AUTOMATIC TRANSFER SWITCH

[75] Inventors: Rene Castenschiold, New Vernon; John P. Andersen, Hackettstown, both of N.J.

[73] Assignee: Automatic Switch Company, Florham Park, N.J.

[21] Appl. No.: 503,781

[22] Filed: Apr. 3, 1990

[51] Int. Cl.⁵ .............................................. H01H 9/20
[52] U.S. Cl. .................................... 307/64; 307/113; 335/161
[58] Field of Search ........................ 307/23, 51, 64, 65, 307/66, 67, 68, 85, 113; 335/161

[56] References Cited

U.S. PATENT DOCUMENTS

| | | |
|---|---|---|
| 3,936,782 | 2/1976 | Moakler et al. ............... 335/161 |
| 4,021,678 | 5/1977 | Moakler et al. ............... 307/64 |
| 4,095,123 | 6/1978 | Takahashi ..................... 307/115 |
| 4,157,461 | 6/1979 | Wiktor ......................... 307/64 |
| 4,189,649 | 2/1980 | Przywozny et al. ............ 307/64 |
| 4,398,097 | 8/1983 | Schell et al. ................. 307/64 |
| 4,405,867 | 9/1983 | Moakler et al. ............... 307/64 |

Primary Examiner—J. R. Scott
Assistant Examiner—Jeffrey A. Gaffin
Attorney, Agent, or Firm—Alan H. Levine

[57] ABSTRACT

An automatic transfer switch having two sets of phase switches, one set for connection between a normal source of power and a load, and the other set for connection between an emergency power source and the load. The transfer switch includes two pairs of neutral switches, one pair for connection in parallel between the normal source neutral and the load neutral, and the other pair for connection in parallel between the emergency source neutral and the load neutral. The phase switches can operate to provide an "open transition" transfer, wherein the phase switches connecting the load to one source open before closing of the phase switches which connect the load to the other source, or a "closed transition" transfer, wherein the phase switches connecting the load to one source open after closing of the phase switches which connect the load to the other source. Prior to transfer operation, the pair of neutral switches corresponding to the closed set of phase switches are closed and the pair of neutral switches corresponding to the open set of phase switches are open. During transfer of the load, whether by open or closed transition transfer, one neutral switch of each pair are closed before the open set of phase switches close and those neutral switches remain closed until after the closed set of phase switches opens. Thereafter, the pair of neutral switches which had originally been open are both closed, and the pair of neutral switches which had originally been closed are both opened.

13 Claims, 13 Drawing Sheets

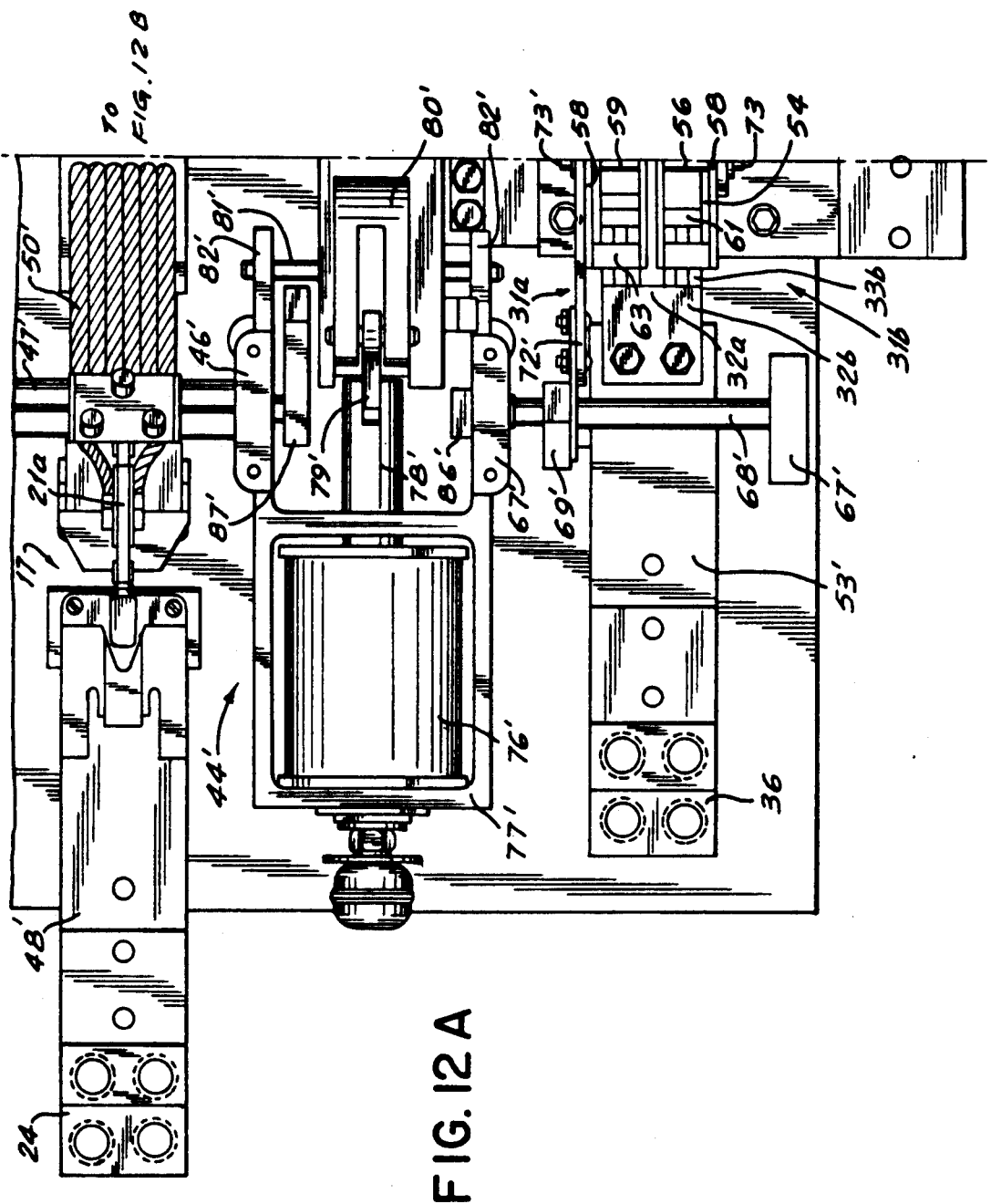

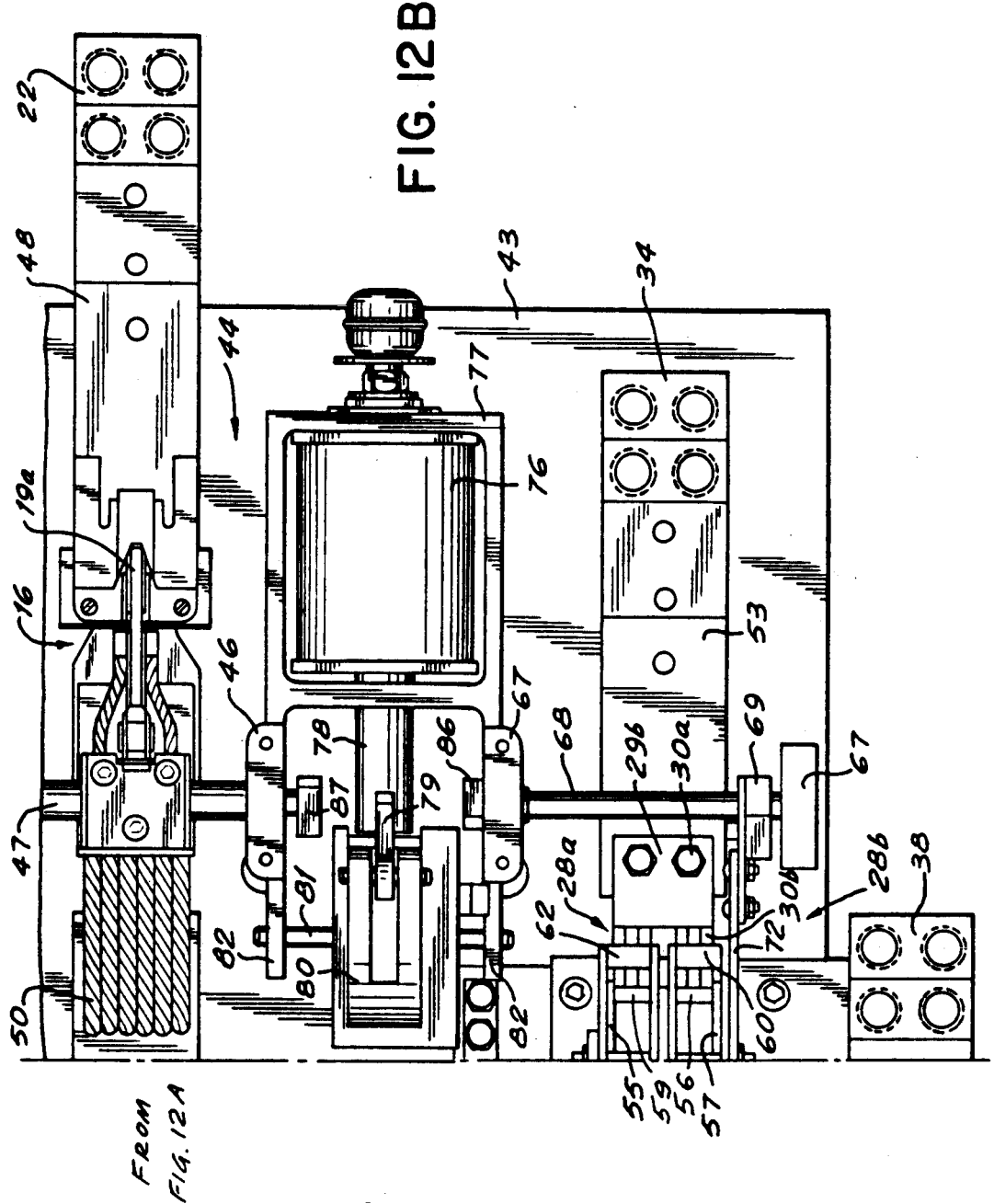

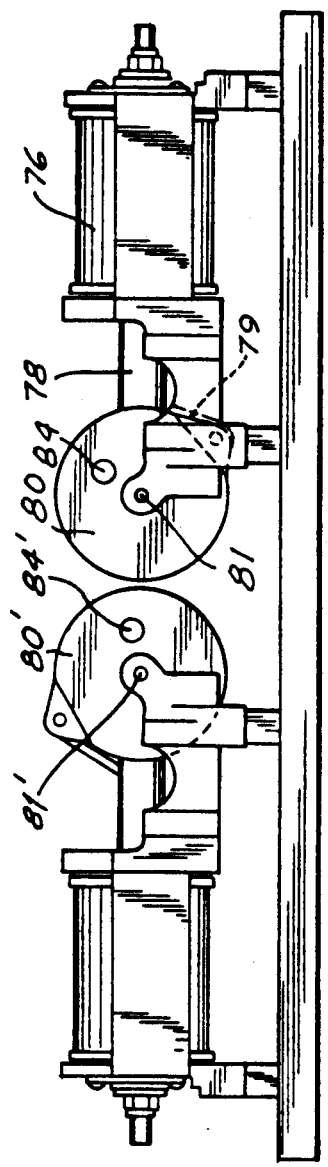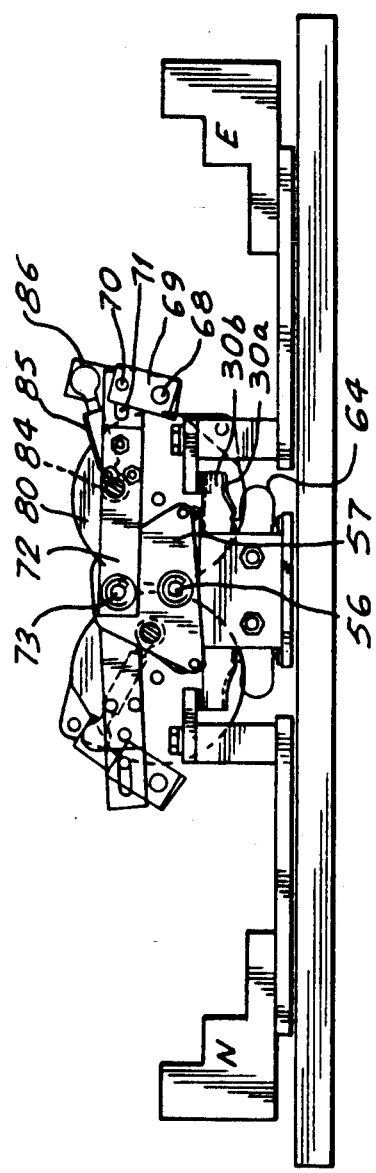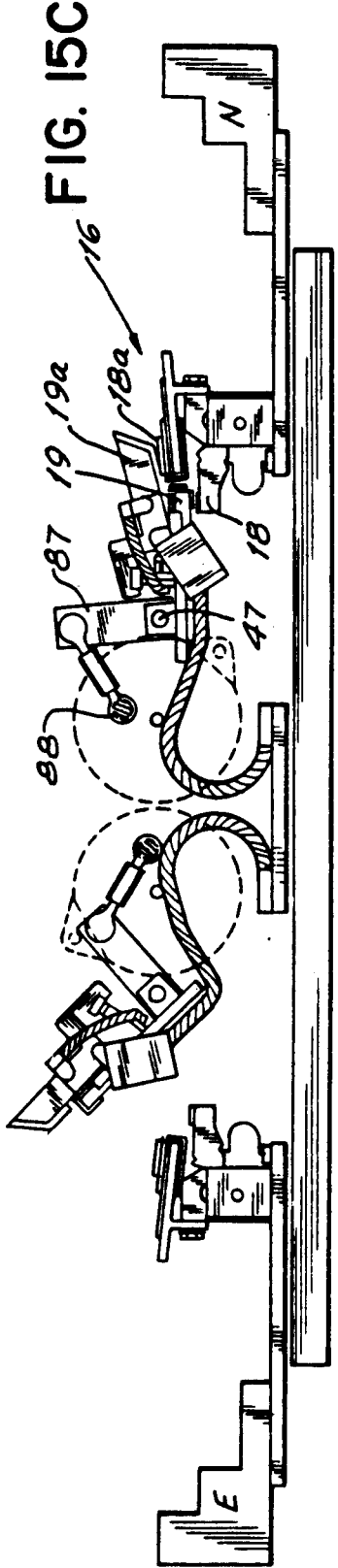

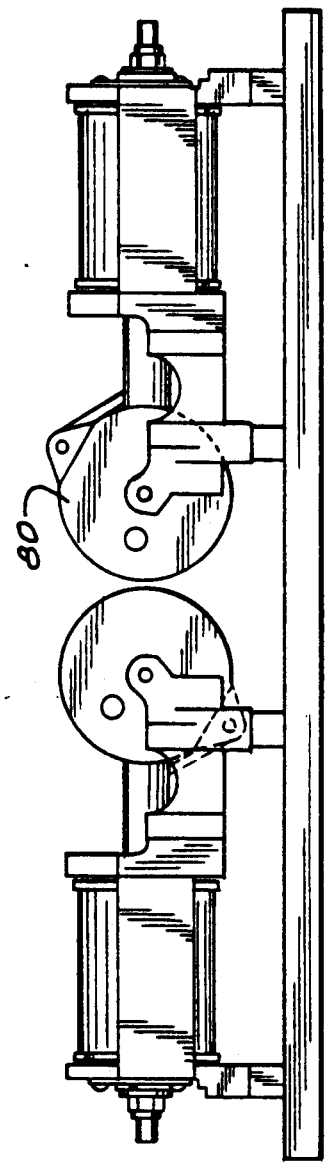
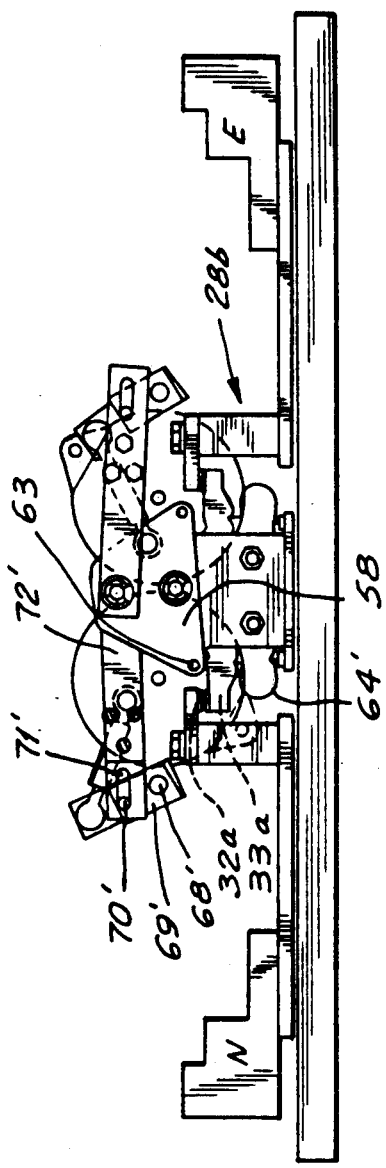
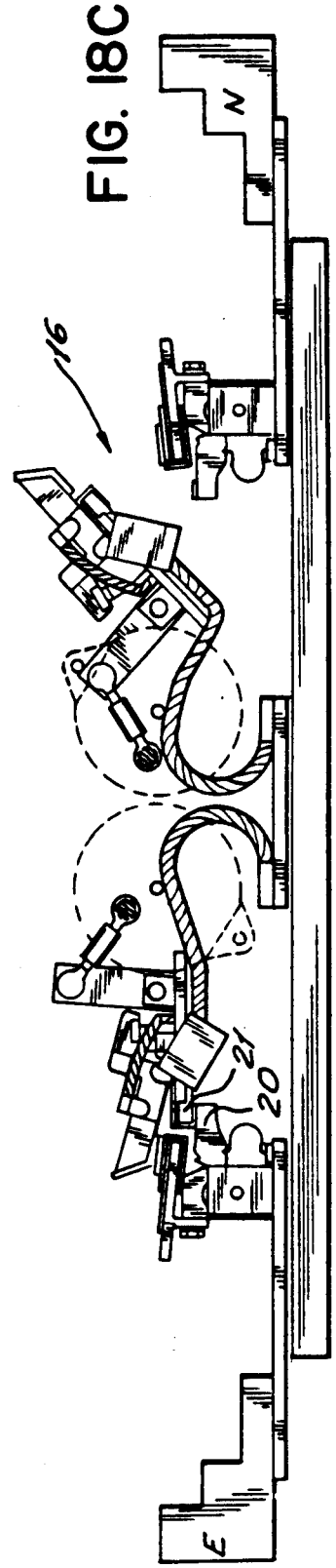

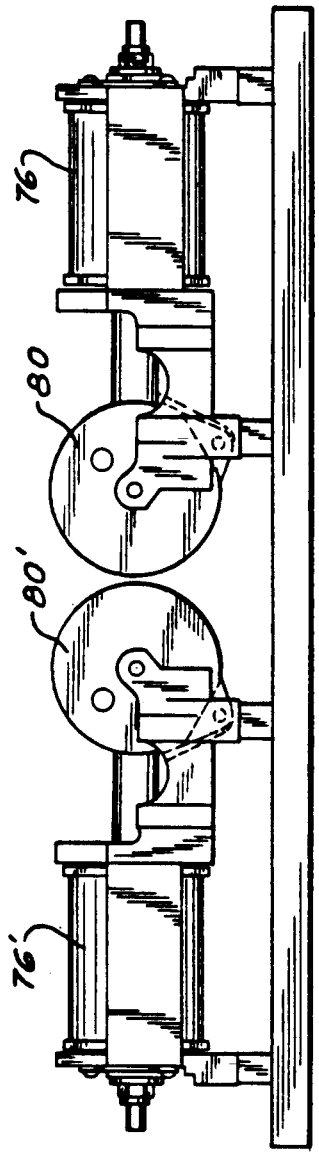
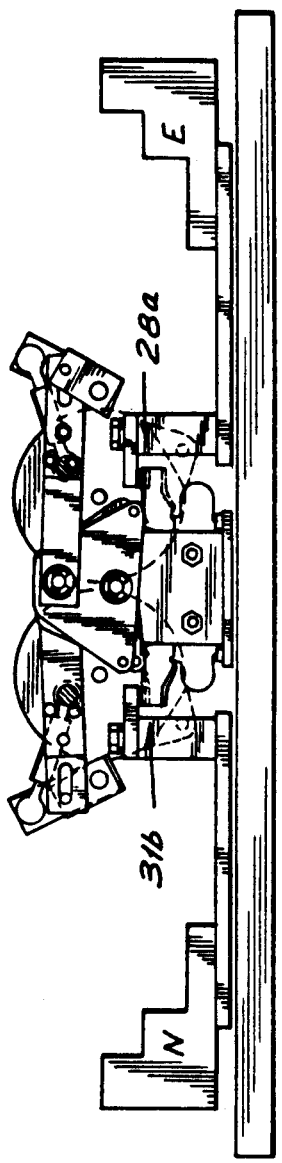
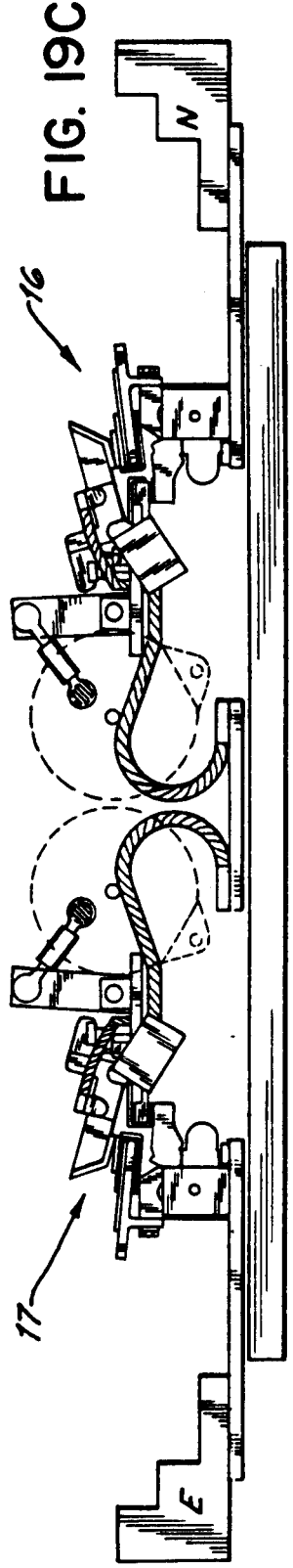

AUTOMATIC TRANSFER SWITCH

This invention relates to automatic transfer switches which are used to automatically transfer an electrical load from a normal source of electric power to an emergency source of electric power upon the happening of some predetermined event.

Automatic transfer switches are typically multi-pole switches. Thus, an automatic transfer switch used with a three phase, four wire system will always include three poles for switching the three phase conductors of the load between the three phase conductors of the normal power source and the three phase conductors of the emergency power source. The fourth, neutral conductor of the load is often permanently connected to the neutral conductors of the normal and emergency sources.

In certain instances, it has been found that the neutral conductors of the load, normal source, and emergency source, should not be permanently connected together. One such instance involves the situation in which a ground fault detector is associated with the normal source. In such a case, it is possible that the interconnected and grounded normal source and emergency source neutral conductors can produce a situation in which a ground fault in the normal source will not be sensed by the ground fault detector. To overcome this problem, it is desirable to use a fourth pole of the transfer switch to transfer the load neutral from one power source to the other when the transfer switch operates.

Transferring the neutral has, however, caused its own problems. Although theoretically all four poles of the transfer switch operate simultaneously, as a practical matter it is impossible to insure that all four switches, namely, the three phase switches and the one neutral switch, connecting the load to a power source will open at precisely the same time. If it should happen that the neutral switch opens even an instant before the phase switches, severely unbalanced voltages may be applied to the load causing damage to it. Furthermore, in such a circumstance there may be danger to personnel.

This problem is outlined in U.S. Pat. No. 3,936,782, issued Feb. 3, 1976, wherein an automatic transfer switch is shown and described having provision for disconnecting the load neutral from the neutral of the power source from which the load is disconnected, and for transferring the load neutral to the alternative power source when the transfer switch is operated, but which nevertheless insures that the load neutral is never disconnected from a power of source while the phase conductors of the load are still connected to that power source. This latter feature is sometimes referred to as an "overlapping neutral" operation.

In the automatic transfer switch of the patent mentioned above, a single actuating means, such as a solenoid, is employed to simultaneously operate the phase switches which control connection of the load to the normal power source and the phase switches which control connection of the load to the emergency power source. Also, the same actuating means serves to operate the switches which control connection of the load neutral conductor to the neutral conductors of the two power sources. More specifically, in the automatic transfer switch of the patent, the three movable contacts of the load/emergency source phase switches are mounted on a single rocker mechanism so that all six movable contacts pivot about the single pivot axis of the rocker mechanism. Such a transfer switch has only two stable positions, one in which the load/normal source phase switches are closed and the load/emergency source phase switches are open, and the other in which the load/normal source phase switches are open and the load/emergency source phase switches are closed. In addition, when the actuating means operates, it swings the rocker mechanism to open the closed switches and instantaneously thereafter close the open switches.

While the automatic transfer switch of the patent operates entirely satisfactorily, it is sometimes desirable to have an automatic transfer switch in which the load/normal source switches and the load/emergency source switches are operable independently. As a result, the duration for which the load phase conductors are disconnected from the phase conductors of both power sources during a transfer operation can be extended, e.g., up to several seconds. This can be important when a long arc is drawn between the movable and stationary contacts upon opening of the closed phase switches; a long period of duration of disconnection insures that the arc is extinguished before the open switches close. Furthermore, with independently operated switches, a stable condition can be achieved in which both sets of switches are open, should this be desired. In addition, standard contactor or switch components can be employed to make a transfer switch with independently operable load/normal source and load/emergency source phase switches, as compared to the special switch components used to make the transfer switch of the patent mentioned above.

This situation is referred to in U.S. Pat. No. 4,021,678, issued May 3, 1977, wherein an automatic transfer switch is shown and described having independently operable load/normal source and load/emergency source switches, and having provision for disconnecting the load neutral from the neutral of the power source from which the load is disconnected, and for transferring the load neutral to the alternative power source when the transfer switch is operated, but which nevertheless provides an overlapping neutral feature, i.e., insures that the load neutral is never disconnected from a power source while the phase conductors of the load are still connected to that power source. By "independently operable" switches is meant that a separate actuating means, such as a solenoid, is employed to operate each set of phase switches. In this arrangement, the same actuating means which operates one set of phase switches also operates one of the neutral switches, and the same actuating means which operates the other set of phase switches also operates the other neutral switch.

The automatic transfer switch of the last-mentioned patent serves to effect an "open transition" transfer of the load between the two sources. During an open transition transfer, the automatic transfer switch disconnects the load from the source to which it had been connected before connecting the load to the other source. This results in the load being momentarily disconnected from both power sources. In most circumstances, this momentary interruption of power causes nothing more serious than a flickering of lights, and is of no great consequence.

However, some electronic equipment is highly sensitive to power line disturbances, and with such equipment the small interruption of power that accompanies open transition transfer from one power source to another represents a grave problem. For example, in computer centers where real time data is being continuously processed, a momentary power interruption can cause loss of data, false data, or both. Another illustration involves air traffic control. Even momentary interruption of power to equipment used by air traffic controllers often causes malfunction of the equipment and consequent danger to air traffic.

This problem is discussed in U.S. Pat. No. 4,405,867, issued Sep. 20, 1983, which describes a "closed transition" transfer system wherein the emergency generator, after being started and brought up to speed, is momentarily paralleled with the operating utility source, i.e., the load is momentarily connected to both sources, after which the load is transferred to the emergency generator and the utility then disconnected from the load and emergency generator. In this way, the load is supplied with continuous power despite the transfer. Similar momentary paralleling of emergency generator and utility takes place when retransferring the load from the generator to the utility, thereby again avoiding any interruption of power to the load.

While prior art automatic transfer switches, outlined above, provide for overlapping neutral operation during open transition transfer of the load between power sources, they do not offer an automatic transfer switch capable of providing overlapping neutral operation regardless of whether the transfer switch is functioning in either an open transition mode or a closed transition mode.

It is, therefore, an object of the present invention to provide an automatic transfer switch in which overlapping neutral operation takes place during both open transition and closed transition transfer of the load between power sources. Whether the transfer switch functions to perform an open transition or a closed transition is determined by the control panel used with the switch. Control panels of this type are conventional and form no part of the present invention.

It is another object of the invention to provide such an automatic transfer switch wherein the same two actuator means which operate the two sets of phase switches also operate the neutral switches.

To accomplish these objectives, the present invention provides an automatic transfer switch wherein a pair of neutral switches control connection of the load neutral to the normal source neutral, and another pair of neutral switches control connection of the load neutral to the emergency source neutral. This should be compared to the automatic transfer switches of U.S. Pat. Nos. 3,396,782 and 4,021,678, wherein a single load/normal source neutral switch and a single load/emergency source neutral switch are used.

Despite the use of two additional neutral switches, a feature of the invention is that the physical size of all four neutral switches does not exceed the size of the two neutral switches heretofore used with the previous automatic transfer switches described above. This is accomplished by connecting each pair of neutral switches in parallel between the load neutral and its respective phase neutral. As a result, each neutral switch need only have one-half the continuous duty rating, and hence need only be one-half the size, of each phase switch. Each of these smaller switches is required to carry full current by itself during a transfer operation; however, this is not a problem because full current is carried only for a fraction of a second, and these switches can successfully handle full current, without damage, for such a short period of time.

In a preferred embodiment of the invention, the neutral switches are provided in the form of two double throw switches, each double throw switch being operated by one of the actuating means which operates one of the sets of phase switches.

Additional objects and features of the invention will be apparent from the following description, in which reference is made to the accompanying drawings.

Figure 13A:
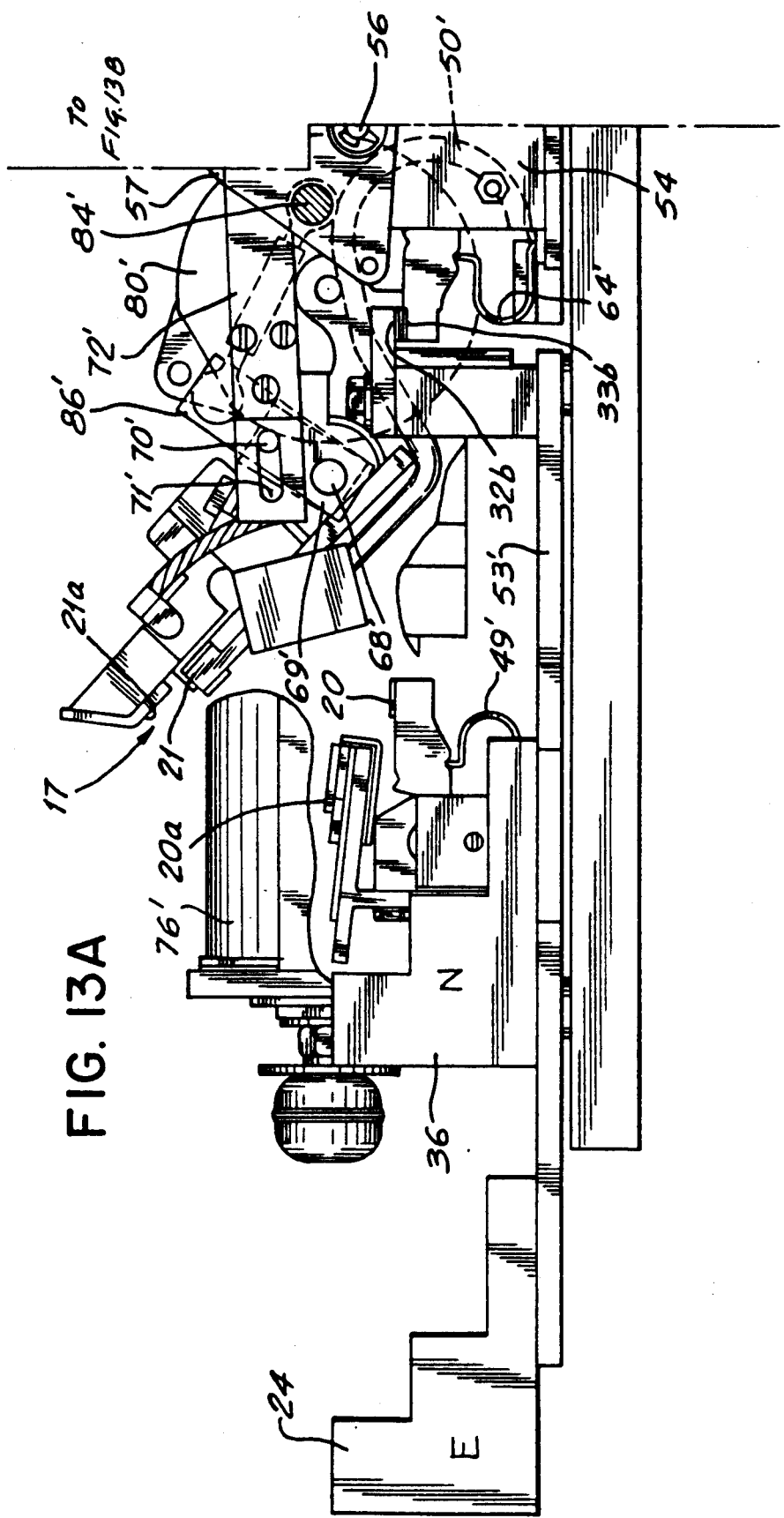
Figure 13B:
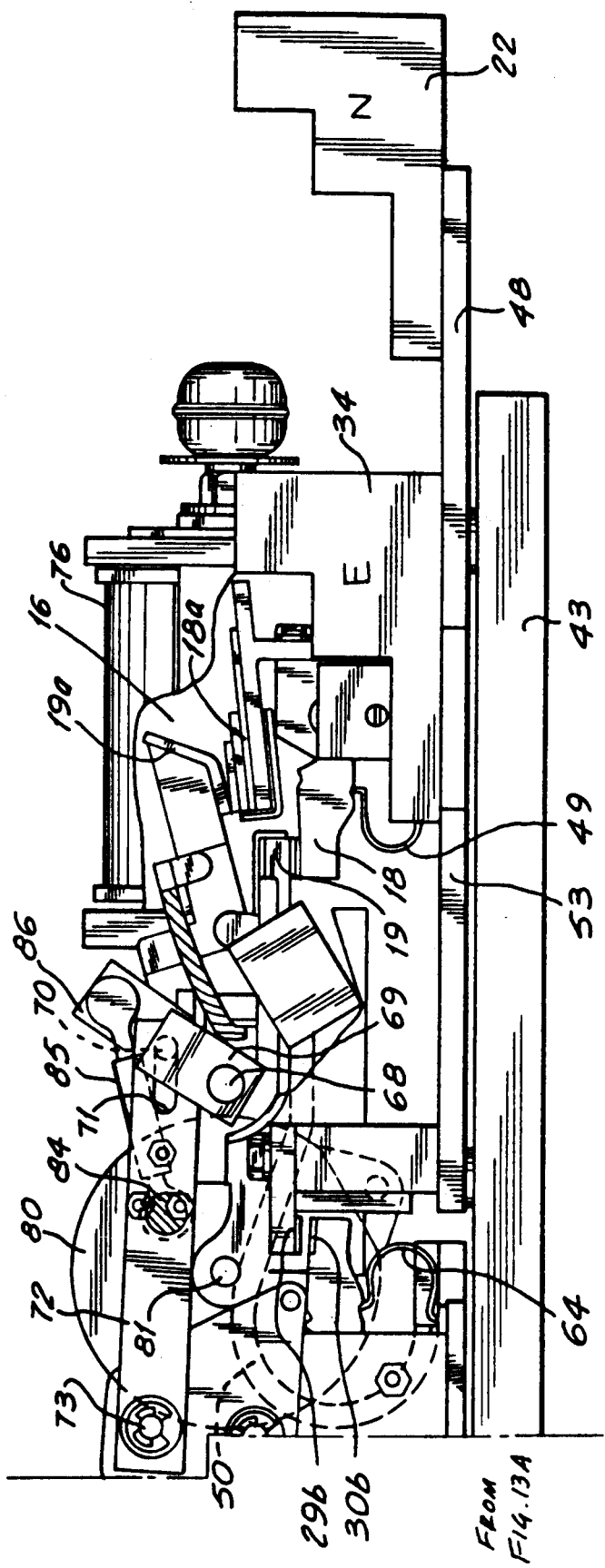
Figure 14A:
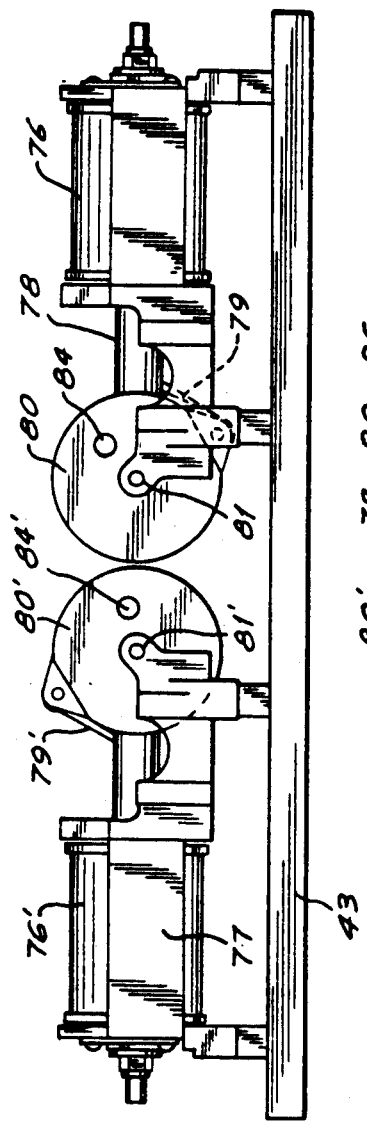

FIGS. 12A and 12B, together, are a fragmentary plan view of an illustrative automatic transfer switch according to the present invention;

FIGS. 13A and 13B, together, are a side elevational view, with some parts broken away and some parts omitted, of the automatic transfer switch of FIG. 12;

FIGS. 14A, B and C through FIGS. 18A, B, and C are fragmentary cross-sectional views illustrating five stages during an open transition transfer operation; and FIGS. 19A, B, and C are fragmentary cross-sectional views illustrating one stage during a closed transition transfer.

The invention will be described in connection with a three phase, four wire system in connection with which a four-pole automatic transfer switch is employed. However, it is understood that the invention has utility with other types of systems as well. Three poles of the transfer switch are used to control power to the three phase conductors of the load, and the fourth pole of the transfer switch controls connection of the load neutral conductor.

Figure 1:
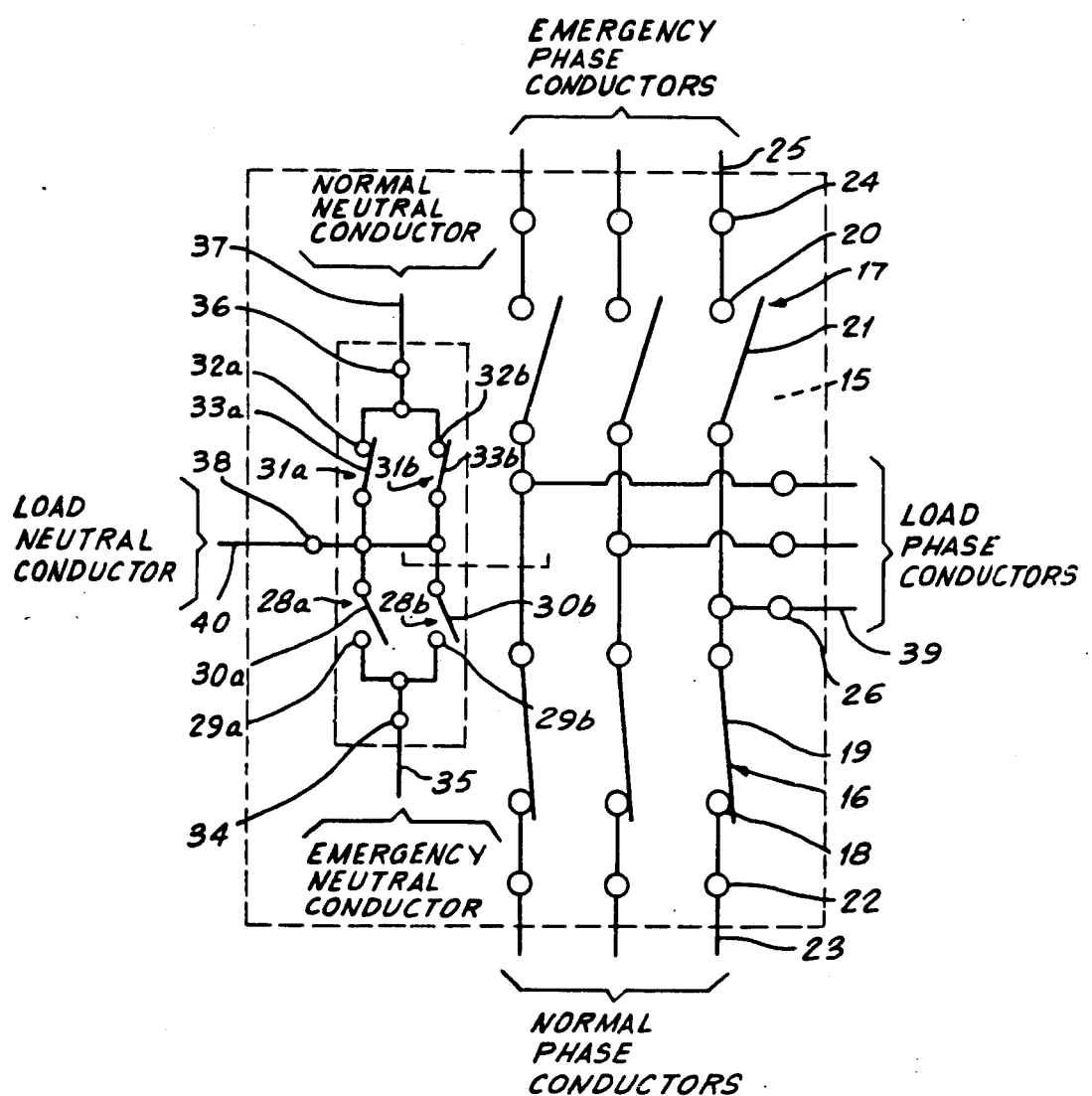
FIG. 1 is a schematic diagram of an automatic transfer switch according to the present invention.

In the schematic illustration of FIG. 1, the automatic transfer switch 15 chosen to illustrate the present invention includes a set of three phase switches 16 for connecting a normal source of electric power, such as that provided by an electric utility, to a load, and a set of three phase switches 17 for alternatively connecting an emergency source of electric power, such as may be provided by a local engine-generator arrangement, to the load. Each of the switches 16 includes a stationary contact 18 and a movable contact 19, and each of the switches 17 includes a stationary contact 20 and a movable contact 21. Each stationary contact 18 is electrically connected to a terminal 22 of the transfer switch which can be connected to a phase conductor 23 of the normal source. Each of the stationary contacts 20 is electrically connected to a terminal 24 of the transfer switch which can be connected to a phase conductor 25 of the emergency source. The movable contact 19 of each of switches 16 is electrically connected to the movable contact 21 of one of the switches 17, and each interconnected pair of contacts 19 and 21 is electrically connected to a terminal 26 of the transfer switch. Terminal 26 can be connected to a phase conductor 39 of the load.

Automatic transfer switch 15 also includes two neutral switches 28a and 28b, having two stationary contacts 29a and 29b and two movable contacts 30a and 30b, respectively, and two neutral switches 31a and 31b, having two stationary contacts 32a and 32b and two movable contacts 33a and 33b, respectively. Stationary contacts 29a and 29b are electrically connected to a terminal 34 of the transfer switch which can be connected to the neutral conductor 35 of the emergency of the source. Stationary contacts 32a and 32b are electrically connected to a terminal 36 of the transfer switch which can be connected to the neutral conductor 37 of the normal source. Movable contacts 30a and 30b and movable contacts 33a and 33b are electrically interconnected and both are electrically connected to a terminal 38 of the transfer switch which can be connected to the neutral conductor 40 of the load.

Figure 2:
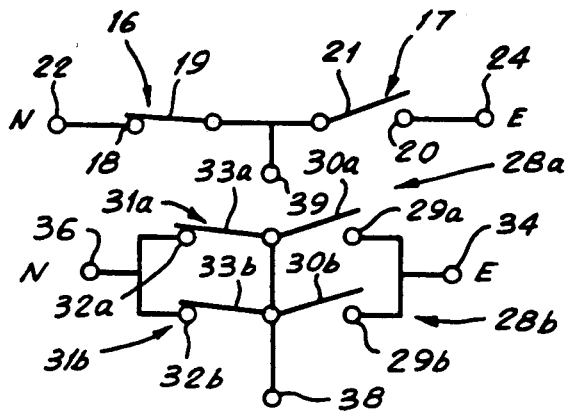
FIGS. 2-6 are schematic diagrams illustrating the operation of the phase switches and neutral switches of the automatic transfer switch during an open transition transfer.

FIGS. 2-6 illustrate schematically how the movable contacts 19, 21, 30a, 30b, 33a, and 33b move in relation to each other. Initially, as shown in FIGS. 1 and 2, the three phase switches 16 are closed, as are neutral switches 31a and 31b, and the three phase switches 17 are open, as are neutral switches 28a and 28b. In other words, each movable contact 19 engages its respective stationary contact 18, movable contacts 33a and 33b engage stationary contacts 32a and 32b, respectively, each of the movable contacts 21 is separated from its respective stationary contact 20, and movable contacts 30a and 30b are separated from stationary contacts 29a and 29b, respectively. Consequently, the load is connected to the normal source and disconnected from the emergency source. Assume now that for some reason the load is to be disconnected from the normal source and connected to the emergency source. This may be because the normal source has failed. Assume also that the transfer operation is to be of the open transition type.

Figure 3:
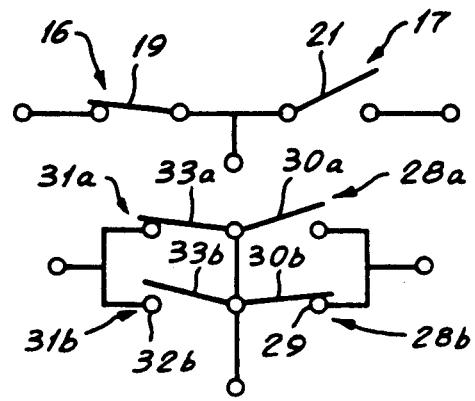
Figure 4:
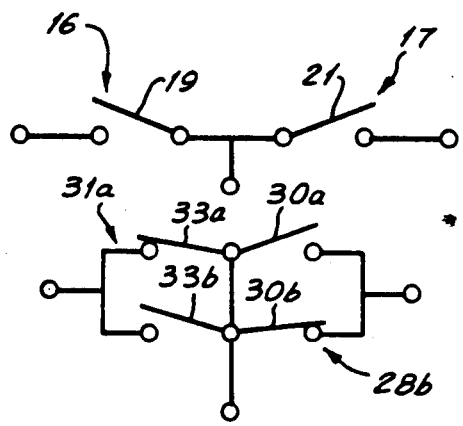
Figure 5:
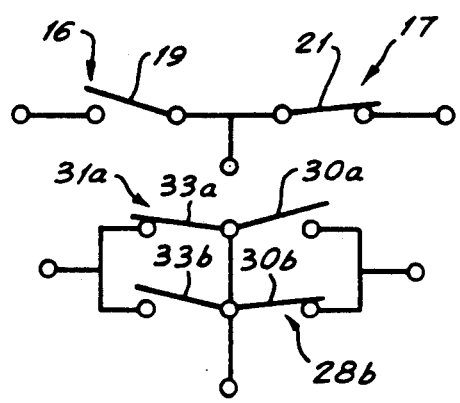
Figure 6:
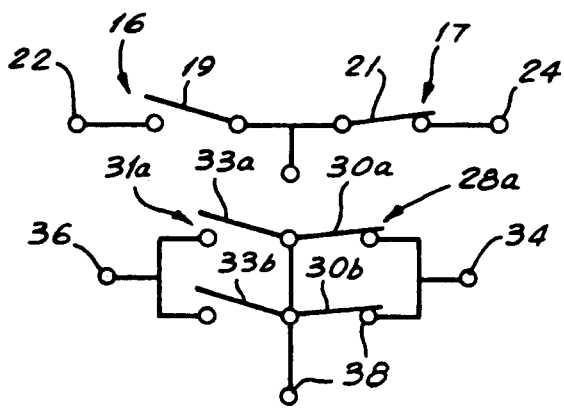

The first step in the transfer operation, as illustrated in FIG. 3, is that neutral switch 28b closes, and simultaneously neutral switch 31b opens, before phase switches 16 open and while neutral switch 28a remains open and neutral switch 31a remains closed. Next, as shown in FIG. 4, phase switches 16 open while neutral switches 28b and 31a remain closed. As a result, the load is now disconnected from the normal source, although it has not yet been connected to the emergency source. Following this, as shown in FIG. 5, phase switches 17 close while neutral switches 28b and 31a remain closed. As a result, the load is now connected to the emergency source. Finally, as indicated in FIG. 6, neutral switch 31a opens, and simultaneously neutral switch 28a closes. As a result, the load neutral is now disconnected from the normal source neutral, while the load phase and neutral conductors are connected to the emergency source phase and neutral conductors. In retransferring the load from the emergency source to the normal source, the same sequence of steps is followed, except in reverse order. The transfer just described is of the open transition type, since for a fraction of a second during the transfer, the load was disconnected from both sources (FIG. 4).

Figure 7:
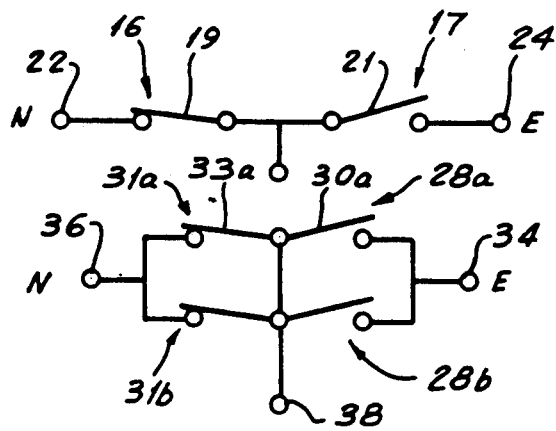
FIGS. 7-11 are similar to FIGS. 2-6, but during a closed transition transfer.

Assume now that the same transfer switch is to be used to disconnect the load from the normal source and connect it to the emergency source, but this time a closed transition transfer is required. FIGS. 7-11 schematically illustrate this operation. Initially, as shown in FIGS. 1 and 7, the three phase switches 16 are closed, as are neutral switches 31a and 31b, and the three phase switches 17 are open, as are neutral switches 28a and 28b.

Figure 8:
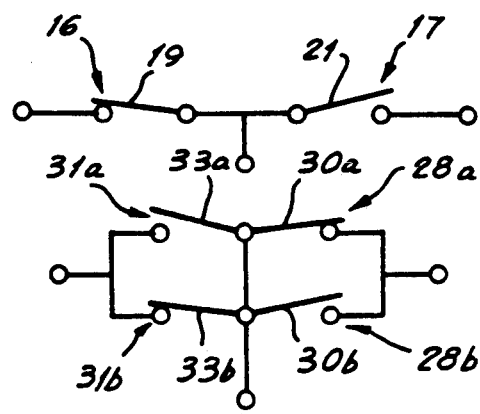
Figure 9:
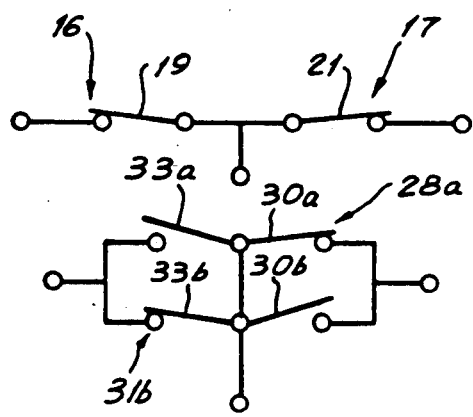
Figure 10:
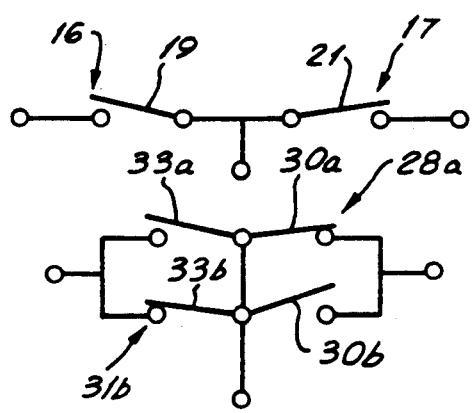
Figure 11:
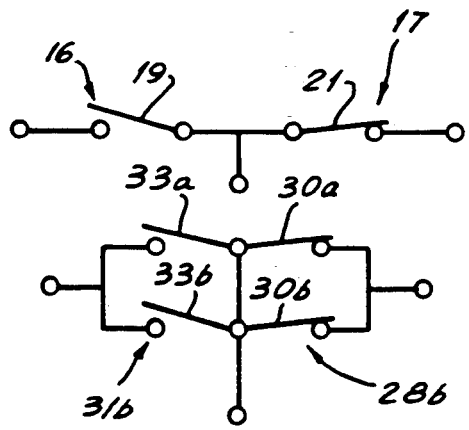

The first step in the transfer operation, as illustrated in FIG. 8, is that neutral switch 28a closes, and simultaneously neutral switch 31a opens, before phase switches 16 open and phase switches 17 close, and while neutral switch 28b remains open and neutral switch 31b remains closed. Next, as shown in FIG. 9, phase switches 17 close, while phase switches 16 and neutral switches 28a and 31b remain closed. As a result, the load is now connected to both sources. Following this, as shown in FIG. 10, phase switches 16 open, while neutral switches 28a and 31b remain closed. As a result, the load is now disconnected from the normal source and connected only to the emergency source. Finally, as indicated in FIG. 11, neutral switch 31b opens, and simultaneously neutral switch 28b closes. As a result, the load neutral is now disconnected form the normal source neutral, while the load phase and neutral conductors are connected to the emergency source phase and neutral conductors. Here again, in retransferring the load from the emergency source to the normal source, the same sequence of steps is followed, except in reverse order. The transfer just described is of the closed transition type, since for a fraction of a second during the transfer, the load was connected to both sources (FIG. 9).

It will be appreciated from the above description that, during either open or closed transition transfer, the closing of neutral switches overlaps the opening and closing of the phase switches 16 and 17. Thus, during open transition transfer (FIGS. 2-6), neutral switches 31a and 28b are closed, to connect the load neutral to both normal and emergency source neutrals, from before the time the load phase conductors are disconnected from the normal source phase conductors until after the time the load phase conductors are connected to the emergency source phase conductors. Also, during closed transition transfer (FIGS. 7-11), neutral switches 28a and 31b are closed, to connect the load neutral to both normal and emergency source neutrals, from before the time the load phase conductors are connected to the emergency source phase conductors until after the time the load phase conductors are disconnected from the normal source phase conductors.

According to the invention, neutral switches 31a and 31b are connected in parallel between the normal source neutral conductor 37 (FIG. 1) and the load neutral conductor 40. Similarly, neutral switches 28a and 28b are connected in parallel between the emergency source neutral conductor 35 and the load neutral conductor 40. In this way, each neutral switch need only have one-half the continuous duty rating, and hence need only be one-half the size of each of the phase switches 16 and 17. The reason is that due to the parallel connection, each neutral switch carries only one-half the total neutral current carried by each phase switch, during continuous duty operation.

Also, according to the invention, neutral switches 28a and 31a constitute a single double throw switch, and neutral switches 28b and 31b constitute another double throw switch. In other words, movable contacts 30a and 33a are mounted for operation by one rocker arm of a double throw switch, and movable contacts 30b and 33b are mounted for operation by another rocker arm of a another double throw switch. In this way, the same actuator which operates phase switches 16 can simultaneously operate movable contacts 30b and 33b, i.e., open and close switches 28b and 31b, and the same actuator which operates phase switches 17 can simultaneously operate movable contacts 30a and 33a, i.e., open and close switches 28a and 31a.

A transfer switch according to the present invention is shown in more detail in FIGS. 12A-C and 13A-C. The transfer switch includes a base plate 43 (FIGS.

12A-C and 13A-C) carrying three terminals 22 (only one of the terminals being shown) for connection to the three phase conductors of the normal source, and three terminals 24 for connection to the three phase conductors of the emergency source. Also carried by the base plate 43 are a terminal 34 for connection to the neutral conductor of the emergency source, a terminal 36 for connection to the neutral conductor of the normal source, and a terminal 38 for connection to the neutral conductor of the load.

Base 43 carries a set of three phase switches 16, and a set of three phase switches 17, only one of each set being shown. Base 43 also carries neutral switches 28a, 28b, 31a, and 31b. In addition, base 43 carries an actuator means 44, for operating phase switches 16 and neutral switches 28b and 31b, and an actuator means 44' for operating phase switches 17 and neutral switches 28a and 31a. The phase switches 16 and 17 are identical, and actuator means 44 and 44' are substantially identical in construction and operation, and therefore only phase switches 16 and actuator means 44 will be described in detail, the corresponding parts of the phase switches 17 and actuator 44' bearing the same reference numerals followed by a prime.

Mounted on base 43 are two spaced-apart brackets 46 (only one being shown in FIG. 12B) between which a shaft 47 is rotatably supported. Between brackets 46, shaft 47 has a square cross-sectional shape, and carries three movable main contacts 19 (FIG. 13B) each of which is furnished with a movable arcing contact 19a. Movable main contacts 19 and arcing contacts 19a are cooperable with stationary main contacts 18 and stationary arcing contacts 18a, respectively, the latter being electrically connected to terminals 22 by a conductive strip 48. Contacts 18 are constantly biased toward contacts 19 by a spring 49. A flexible conductor 50 forms part of a permanent electrical connection between contacts 19, 19a and load terminal 38.

In practice, a normal source phase conductor is connected to terminal 22, an emergency source phase conductor is connected to terminal 24, and a load phase conductor is connected to terminal 38. Consequently, when phase switches 16 are closed, i.e., movable contacts 19, 19a engage stationary contacts 18, 18a, a circuit is completed from normal source terminal 22, through contacts 18 and 19, and the connection including flexible conductor 50, to load terminal 38. In this way, each of the three normal source phase conductors is connected to the corresponding three load phase conductors. Similarly, when phase switches 17 are closed, i.e., movable contacts 21, 21a engage stationary contacts 20, 20a, a circuit is completed from emergency source terminal 24, through contacts 20 and 21, and the connection including flexible conductor 50', to load terminal 38.

Figure 14B:
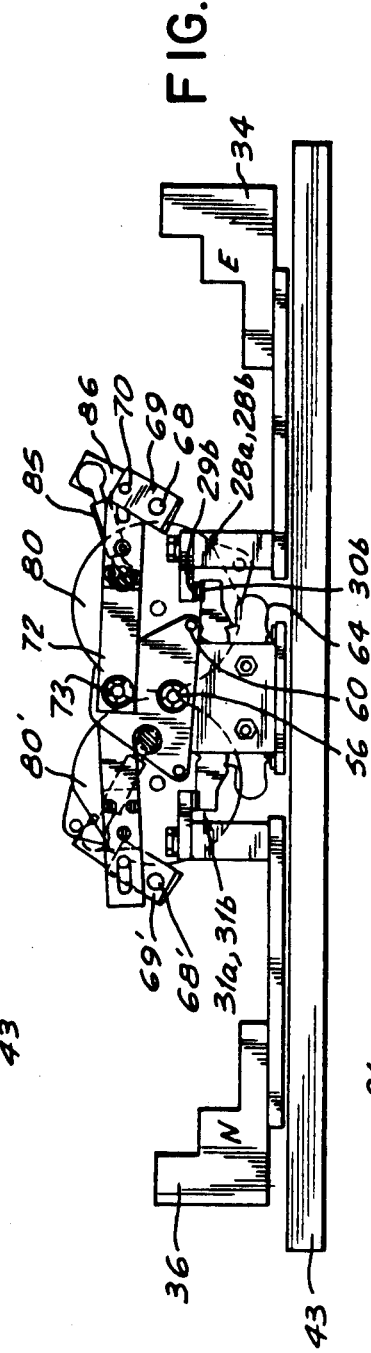
Figure 14C:
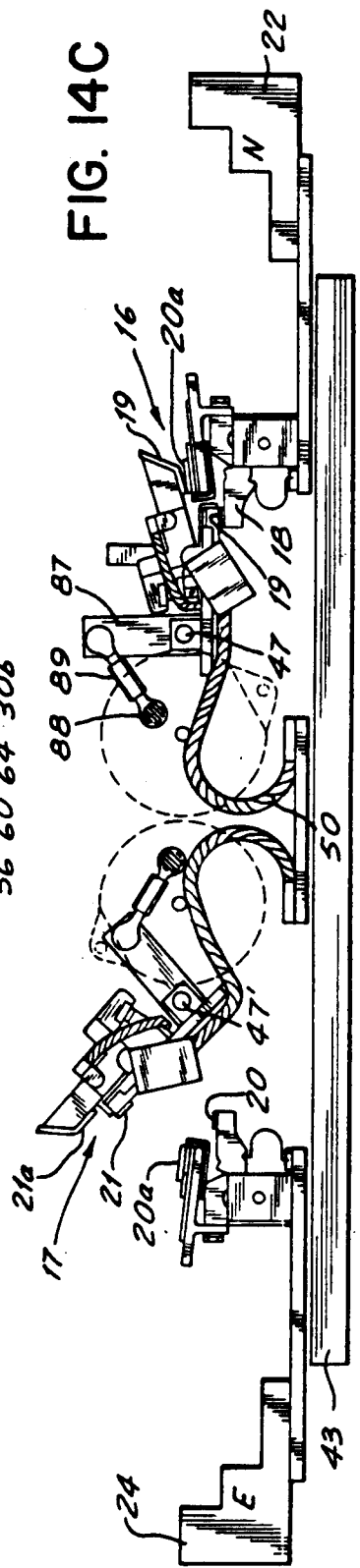

In FIGS. 12A, B and 13A, B phase switches 16 are closed and phase switches 17 are open. By pivoting shaft 47 (FIG. 12) in a counterclockwise direction, as viewed in FIG. 14, contacts 19 and 19a are lifted away from contacts 18 and 18a, respectively, and switches 16 are all opened simultaneously. By pivoting shaft 47' in a counterclockwise direction, as viewed in FIG. 14, contacts 21 and 21a move toward contacts 20 and 20a, respectively, so that switches 17 are closed simultaneously. The manner in which shafts 47 and 47' are pivoted will be described below.

Each of the neutral switches 28a, 28b, 31a, and 31b includes a stationary contact mounted on base 43. Thus, stationary contacts 29a and 29b (FIG. 12B) are located adjacent to each other and connected electrically to emergency neutral terminal 34 by conductive strip 53 (see also FIG. 13B), and stationary contacts 32a and 32b are located side-by-side and connected electrically to normal neutral terminal 36 by conductive strip 53' (In FIGS. 13A and B, only contacts 29b and 32b are visible, contacts 29a and 32a, respectively, being directly behind them).

On either side of the neutral switches stationary contacts, upstanding brackets 54 and 55 are mounted on base 43 (only bracket 54 being visible in FIG. 13). Pivoted to bracket 54, by a pivot pin 56, are a pair of spaced-apart, trapezoid shaped, plate-like rocker arms 57. A similar pair of spaced-apart rocker arms 58 are pivoted to bracket 55 by a pivot pin 59. Extending between the bottom corners of rocker arms 57 are two short rods 60 and 61, and extending between the bottom corners of rocker arms 58 are two short rods 62 and 63.

Mounted directly beneath rods 60, 61, 62, and 63 are four movable neutral contacts 30b, 33b, 30a, and 33a, respectively. These movable contacts are located beneath, and face, stationary neutral contacts 29b, 32b, 29a, and 32a, respectively, each movable contact being constantly biased toward its respective stationary contact by a spring 64.

Projecting upwardly from base 43 are two spaced-apart brackets 67, between which a shaft 68 is rotatably supported coaxially with shaft 47. (Brackets 67 and 67', as well as terminal 38 are omitted in FIGS. 13A and B so as not to obscure other parts of the transfer switch.) A lever 69 is carried by, and rotates with, shaft 68. A pin 70, projecting from lever 69, fits slidably with a slot 71 at one end of a link 72, the other end of the link being pivotally connected, at 73, to rocker arm 57. (Link 72 is actually formed of two separate pieces, bolted together, as shown in FIG. 12B, one of the pieces being an insulator.)

Actuator means 44 includes a solenoid 76 secured within a bracket 77 mounted on base 43. Solenoid 76 contains an axially-movable armature 78, and is provided with suitable conductors (not shown) for applying an electrical signal to the solenoid to energize it. Armature 78 is pivotally connected by a link 79 (FIGS. 12B and 14A) to a cylindrical weight 80 rotatably carried by a pin 81 extending between two upstanding walls 82 extending from brackets 46 and 67.

A second pin 84 (FIGS. 13B and 14A) projects from one side of weight 80 parallel to pin 81, but eccentric with respect to the axis of rotation defined by pin 81. One end of a link 85 is pivotally connected to weight 80 by pin 84, the other end of link 85 being pivotally connected to a lever 86 (FIGS. 12B, 13B, and 14B) fixed to shaft 68. Another pin 88 (FIG. 14C), coaxial with pin 84, projects from the opposite side of weight 80, and another link 89 pivotally interconnects pin 88 to a lever 87 fixed to shaft 47.

Weight 80 is pivotable between two extreme positions, one of which is illustrated in FIGS. 13B and 14A-C. When solenoid 76 is i.e., toward the right FIG. 14A, causing weight 80 to rotate counterclockwise in FIG. 14A. Upon deenergization of solenoid 76, the inertia of weight 80 causes its continued rotation to its other extreme position illustrated in FIGS. 16A-18A. The difference can be seen by comparing the position of pin 84 in FIGS. 13B and 14A, on the one hand, and in FIGS. 16A-18A on the other hand. Should solenoid 76 be energized again, weight 80 is returned to its original position shown in FIGS. 13B and 14A.

FIGS. 12A, B; 13A, B; and 14A-C illustrate the position of the parts of the transfer switch when the load is connected to the normal source and disconnected from the emergency source. Thus, phase switches 16 and neutral switches 31a and 31b are closed, and phase switches 17 and neutral switches 28a and 28b are open. The reason that neutral switch 28b is open is that lever 69 is in its clockwise-most position so that pin 70 engages the right end of slot 71 and pulls link 72 toward the right. Due to the connection at 73 between link 72 and rocker arms 57, the latter are tilted in a clockwise direction about pin 56, so that rod 60 presses downwardly on movable contact 30b pushing that contact away from stationary contact 29b, against the force of spring 64. The reason that neutral switch 28a is open is that lever 69' is also in its clockwise-most position wherein pin 70' engages the rightward end of slot 71' thereby pushing link 72' to its rightward-most position. Due to the connection between link 72' and rocker arms 58 at pin 73', the rocker arms are tilted in a clockwise direction wherein rod 62 presses downwardly on movable contact 30a, thereby holding that contact away from stationary contact 29a.

The operation of the transfer switch during an open transition transfer of the load from the normal source to the emergency source may best be seen in FIGS. 15A-C through 18A-C. Each of these figures shows certain parts of the transfer switch at a particular instant of time. The views show the weights 80, 80' and their respective pins 84, 84' and 88, 88'. In addition, all the views show the phase switches 16 and 17 and the neutral switches 28a, 28b, 31a, and 31b, as well as some of the operating linkages for these switches.

Upon energization of solenoid 76, armature 78 begins to move into the solenoid, i.e., toward the right in FIG. 15A, and during this initial movement weight 80 is rotated through a short distance in a counterclockwise direction (compare FIGS. 14A and 15A). This initial rotation of weight 80 causes link 85 to rotate lever 86, and hence shaft 68 and lever 69, very slightly in a counterclockwise direction. As a result, pin 70 moves a very short distance toward the left in FIG. 15, permitting link 72 to be moved toward the left by spring 64. More specifically, spring 64, pushes upwardly on movable contact 30b which in turn pushes up on rod 60 carried by rocker arms 57. When pin 70 moves toward the left, spring 64 is then free to move contact 30b and rod 60 upwardly, thereby pivoting rocker arms 57 counterclockwise about pin 56 (compare FIGS. 14B and 15B). Due to the connection at 73 between rocker arms 57 and link 72, the latter is moved toward the left. Movable contact 30b moves sufficiently to engage stationary contact 29b and thereby close neutral switch 28b. This slight initial rotation of weight 80 also causes a small rotation of lever 87 and hence shaft 47 which starts the opening movement of phase switches 16. However, this initial movement does not effect a complete opening of phase switches 16, since although the main movable contact 19 does separate from main stationary contact 18 (FIG. 15C), the arcing contacts 19a and 18a of each phase switch remain in engagement. It will be appreciated, therefore, that while phase switches 16 have not yet completely opened, the load neutral is connected to the neutrals of both the normal and emergency sources through closed neutral switches 31a and 28b, respectively.

Figure 16A:
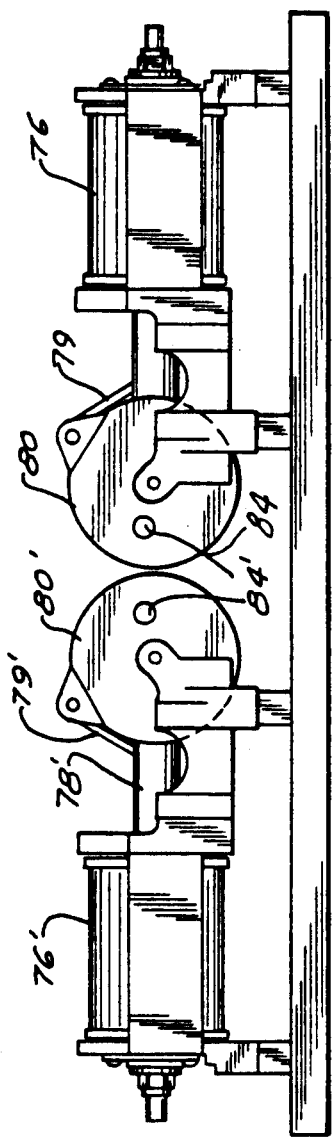
Figure 16B:
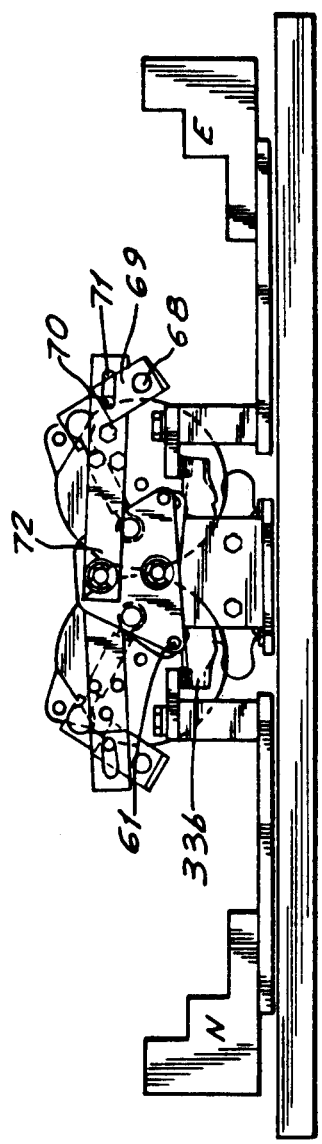
Figure 16C:
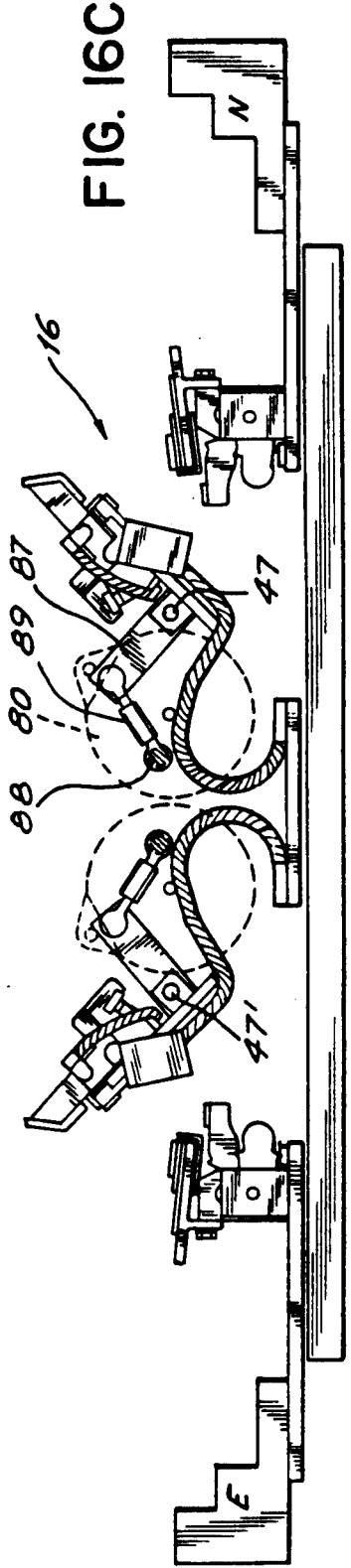

Upon deenergization of solenoid 76, the inertia of weight 80 carries the weight to the position shown in FIG. 16A-C Link 89 transmits the movement of pin 88 to lever 87, thereby pivoting shaft 47 in a counterclockwise direction sufficient to completely open phase switches 16. During this movement of weight 80, lever 69 pivots with shaft 68 from its position shown in FIG. 15B to that of FIG. 16B. As a result, pin 70 moves from the right end of slot 71 in link 72 to the left end of the slot. Most of this movement is lost motion and has no effect on the neutral switches. However, pin 70 reaches the left end of slot 71 just before weight 80 completes its movement, so that during the last increment of movement of the weight, pin 70 positively moves link 72 a short distance toward the left in FIG. 16B. This causes rocker arms 57 to tilt slightly further in a counterclockwise direction, whereby rod 61 presses downwardly on movable contact 33b to separate that contact from stationary contact 32b and thereby open neutral switch 31b. Nevertheless, switches 28b and 31a remain closed, whereby the load neutral conductor remains connected to the neutrals of both power sources. On the other hand, it will be seen that both sets of phase switches 16 and 17 are now open.

Figure 17A:
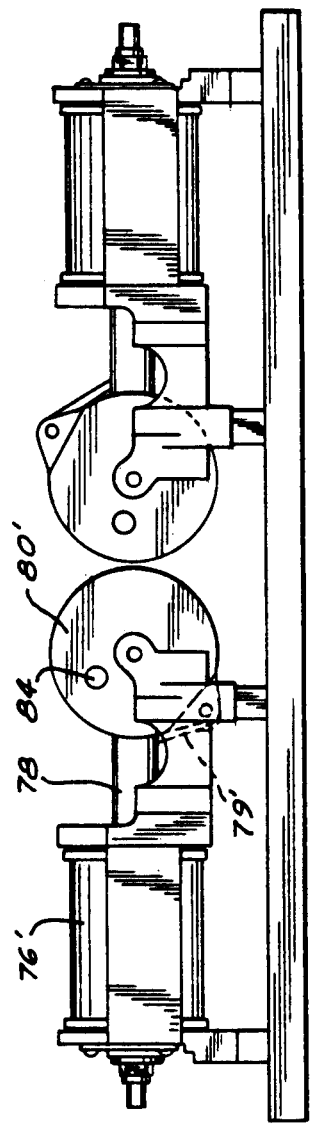
Figure 17B:
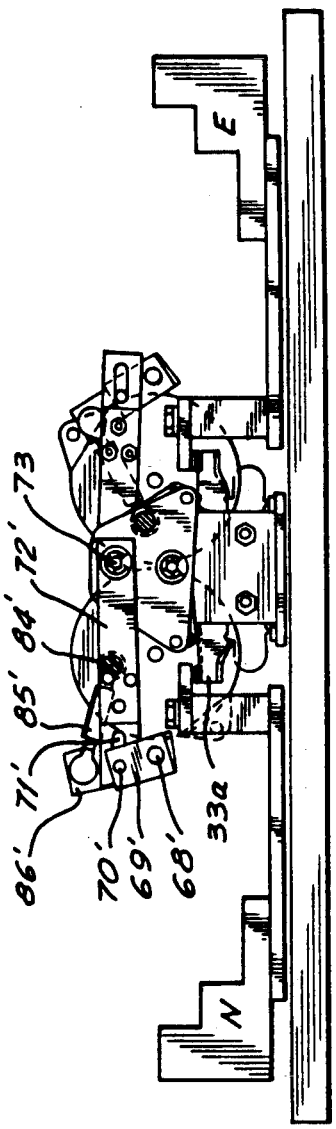
Figure 17C:
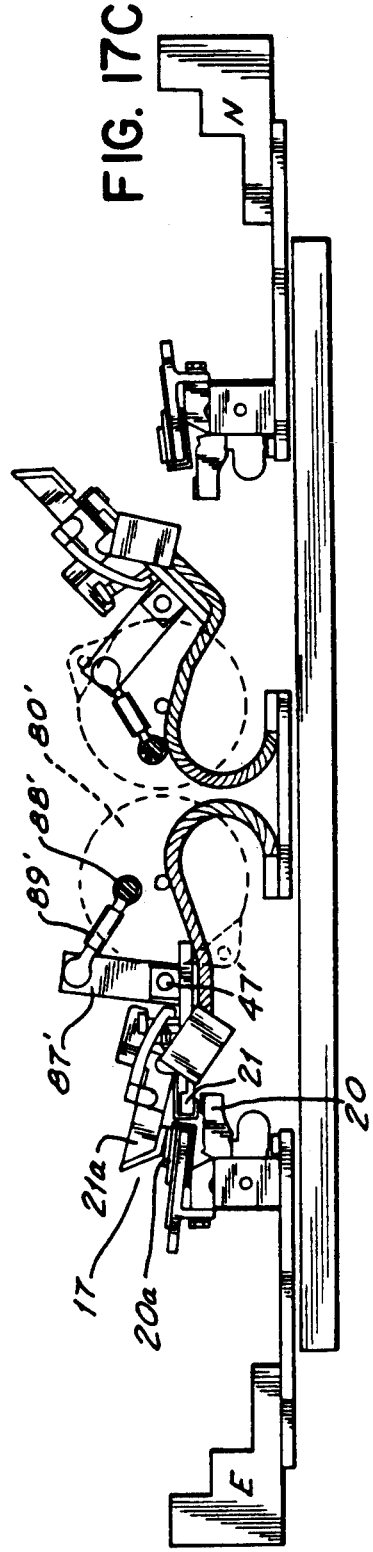

Upon energization and deenergization of solenoid 76', armature 78' moves into and then out of the solenoid to thereby swing weight 80' from the position shown in FIG. 16A to that shown in FIG. 17A. In the position of FIG. 17A, weight 80' has almost reached its final position. Link 85' transmits the movement of pin 84' to lever 86', which thereby rotates shaft 68' and lever 69' counterclockwise to slide pin 70' from the right end to the left end of slot 71' in link 72' (compare FIGS. 16B and 17B). This movement is actually of the lost motion type, and hence there is no change in position of any of the neutral switches.

However, movement of pin 88', projecting from weight 80' is transmitted by link 89' to lever 87'. This causes a counterclockwise pivotal movement of shaft 47' causing the movable main and arcing contacts 21 and 21a of phase switches 17 to swing toward the stationary main and arcing contacts 20 and 20a of those phase switches. In fact, movable arcing contact 21a engages stationary arcing contact 20a to close emergency phase switches 17, while main contacts 20 and 21 are still separated. It will be noted that the load phase conductors are now connected to the emergency source phase conductors through arcing contacts 20a and 21a, while the load neutral conductor remains connected to the neutral conductors of both power sources.

During the final increment of movement of weight 80', i.e., from the position FIG. 17A to that FIG. 18A, shaft 68' and lever 69' pivot slightly further in a counterclockwise direction, causing pin 70', already engaged with the left end of slot 71' to move link 72' a short distance toward the left in FIG. 18B. This causes rocker arm 58 to pivot counterclockwise through a small angle, whereby rod 63 swings movable contact 33a downwardly away from stationary contact 32a (compare FIGS. 17B and 18B). At the same time, main movable contacts 21 of phase switches 17 move into engagement with main stationary contacts 20 to completely close the phase switches.

As a result, the load is connected to the emergency source through the fully closed phase switches 17. In addition, neutral switches 31a and 31b are now both open, so that the load neutral is disconnected from the normal source neutral, and neutral switches 28a and 28b are now both closed, connecting the load neutral to the emergency source neutral.

Transfer back from the emergency source to the normal source is similar to that described above. Solenoid 76' is energized first to close neutral switch 31a (while opening neutral switch 28a) and open phase switches 17, following which solenoid 76 is energized to close phase switches 16 and open neutral switch 28b (while closing neutral switch 31b).

It will be appreciated that neutral switches 28a and 31a form part of a double throw switch including rocker arms 58, which by means of rods 62 and 63 either open switch 28a and permit switch 31a to close, or open switch 31a and permit switch 28a to close. This double throw switch is operated by the same actuating means 44' which operates phase switches 17. Similarly, neutral switches 28b and 31b also form part of a double throw switch including rocker arms 57, which through rods 60 and 61 either open switch 28b and permit switch 31b to close, or open switch 31b and permit switch 28b to close. This double throw switch is operated by the same actuating means 44 which operates phase switches 16. It will also be seen especially from FIG. 12B, that the neutral switches 28a and 28b, together, are no larger than one of the phase switches 16 or 17, and the neutral switches 31a and 31b, together, are no larger than one of the phase switches 16 or 17. Thus, the two double pole switches, serving as the neutral switches, take up no more room than a corresponding fully rated phase switch. Furthermore, together each of the pairs of neutral switches 28a, 28b and 31a, 31b have the same duty rating as one of the phase switches. It will be seen, from the description of the open transition transfer illustrated in FIGS. 14A-C through 18A-C, that operation of the neutral switches overlaps the operation of the phase switches.

Operation of the automatic transfer switch during a closed transition transfer is similar to the operation described above with reference to an open transition transfer. In the open transition transfer from the normal source to the emergency source, solenoid 76 is energized first, followed by energization of solenoid 76', a fraction of a second later. When a closed transition transfer from the normal source to the emergency source is to be effected, solenoid 76' is energized first followed a fraction of a second later by energization of solenoid 76.

Comparing FIGS. 14A and 19A, when solenoid 76' is energized and weight 80' pivots counterclockwise from its FIG. 14A position to its FIG. 19A position, phase switches 17 are closed while phase switches 16 are still closed. As a result, the load is connected for an instant to both the normal and emergency sources. At the same time, neutral switch 28a, which was open, closes, and neutral switch 31b which was closed, opens. As a result, the load neutral is connected to the neutrals of both power sources. Upon energization of solenoid 76, weight 80 pivots from its FIG. 19A position to its FIG. 18A position, whereupon phase switches 16 open. At the same time, neutral switch 31b opens and neutral switch 28b closes. Consequently, the load neutral is now disconnected from the normal neutral, and connected to the emergency neutral through both neutral switches 28a and 28b. The same overlapping neutral operation described above occurs when a closed transition transfer takes place.

Whether the transfer switch operates in an open or closed transition mode is determined by the control panel which controls the transfer. Such control panels are conventional and form no part of this invention. The point is that whether the control panel commands an open transition or a closed transition, determined by the order in which the solenoids are energized, the automatic transfer switch of this invention will respond appropriately, and conducts the required transition while providing for overlapping neutral operation.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. An automatic transfer switch for transferring an electrical load from a normal source of electric power to an emergency source of electric power, and vice versa, comprising:
   (a) a first set of phase switches for connection between the normal source and a load,
   (b) a second set of phase switches for connection between the emergency source and the load,
   (c) first and second neutral switches for connection between a normal source neutral conductor and the load neutral conductor,
   (d) third and fourth neutral switches for connection between an emergency source neutral conductor and the load neutral conductor,
   (e) actuator means for opening and closing said first set of phase switches,
   (f) actuator means operable independently of said actuator means (e) for opening and closing said second set of phase switches,
   (g) means responsive to operation of said actuator means (e) for opening said first neutral switch and closing said third neutral switch when said first set of phase switches opens, and for closing said first neutral switch and opening said third neutral switch when said first set of phase switches closes, and
   (h) means responsive to operation of said actuator means (f) for opening said second neutral switch and closing said fourth neutral switch when said second set of phase switches closes, and for closing said second neutral switch and opening said fourth neutral switch when said second set of phase switches opens.

2. An automatic transfer switch as defined in claim 1 wherein said first and second neutral switches are connected in parallel between the normal source neutral conductor and the load neutral conductor, and said third and fourth neutral switches are connected in parallel between the emergency source neutral conductor and the load neutral conductor.

3. An automatic transfer switch as defined in claim 2 wherein each of the neutral switches is smaller than each of the phase switches.

4. An automatic transfer switch as defined in claim 3 wherein each of the neutral switches has only about one-half the continuous duty rating of each of the phase switches.

5. An automatic transfer switch as defined in claim 1 wherein the first and third neutral switches comprise one double throw switch, and the second and fourth neutral switches comprise another double throw switch.

6. An automatic transfer switch as defined in claim 5 wherein each of the neutral switches includes a stationary contact and a movable contact resiliently biased toward its respective stationary contact, and each of the double throw switches includes a rocker arm pivotable between two extreme positions, the movable contacts of the double throw switch being in path of movement of the rocker arm near its extreme positions, the rocker arm thereby opening one of the neutral switches but not the other in one of its extreme positions, and opening the other neutral switch but not the one in its other extreme position.

7. An automatic transfer switch as defined in claim 5 wherein each of the double throw switches includes a rocker arm pivotable between two extreme positions, one of the neutral switches of each double throw switch being open and the other closed when the rocker arm is in one of its extreme positions, and the other neutral switch being open and the one closed when the rocker arm is in its other extreme position.

8. An automatic transfer switch as defined in claim 7 wherein each of the responsive means includes means for transmitting the movement of its respective actuator means to the rocker arm of its respective double throw switch.

9. An automatic transfer switch as defined in claim 8 wherein the transmitting means includes a lever pivotable back and forth between two extreme positions in response to successive operations of its respective actuating means, and a link interconnecting the lever and the rocker arm of its respective double throw switch, the lever-link-rocker arm connection including a lost motion arrangement so that only the movements of the lever near its extreme positions are transmitted to the rocker arm.

10. An automatic transfer switch as defined in claim 9 wherein the lost motion arrangement includes an elongated slot in the link extending generally in the direction of movement of the link, and a pin projecting from the lever and slidably arranged in the slot.

11. An automatic transfer switch as defined in claim 1
wherein said responsive means (g) opens one of said first and second neutral switches after said first set of phase switches open, and closes said one neutral switch before said first set of phase switches close, and
wherein said responsive means (h) closes one of said third and fourth neutral switches before said second set of phase switches closes, and opens said one neutral switch after said second set of phase switches open.

12. An automatic transfer switch as defined in claim 1 wherein each of said actuator means is electrically operated.

13. An automatic transfer switch as defined in claim 12 wherein each of said actuator means is a solenoid.

* * * * *